United States Patent
Kotha et al.

(10) Patent No.: US 9,575,926 B2
(45) Date of Patent: *Feb. 21, 2017

(54) SYSTEM AND METHOD FOR OPTIMIZING SECURED INTERNET SMALL COMPUTER SYSTEM INTERFACE STORAGE AREA NETWORKS

(71) Applicant: Dell Products, LP, Round Rock, TX (US)

(72) Inventors: Saikrishna M. Kotha, San Jose, CA (US); Gaurav Chawla, Austin, TX (US)

(73) Assignee: DELL PRODUCTS, LP, Round Rock, TX (US)

(*) Notice: Subject to any disclaimer, the term of this patent is extended or adjusted under 35 U.S.C. 154(b) by 838 days.

This patent is subject to a terminal disclaimer.

(21) Appl. No.: 13/793,479

(22) Filed: Mar. 11, 2013

(65) Prior Publication Data

US 2013/0191491 A1    Jul. 25, 2013

Related U.S. Application Data

(63) Continuation of application No. 13/117,912, filed on May 27, 2011, now Pat. No. 8,417,806.

(51) Int. Cl.
| | |
|---|---|
| *G06F 15/16* | (2006.01) |
| *G06F 15/167* | (2006.01) |
| *H04L 29/08* | (2006.01) |
| *H04L 12/413* | (2006.01) |
| *H04L 29/06* | (2006.01) |

(52) U.S. Cl.
CPC .......... *G06F 15/167* (2013.01); *H04L 12/413* (2013.01); *H04L 29/08072* (2013.01); *H04L 63/101* (2013.01); *H04L 67/1097* (2013.01)

(58) Field of Classification Search
CPC ........................... H04L 29/08072; H04L 29/06
USPC .................................. 709/203, 223; 370/392
See application file for complete search history.

(56) References Cited

U.S. PATENT DOCUMENTS

| | | | |
|---|---|---|---|
| 6,708,218 | B1 | 3/2004 | Ellington et al. |
| 6,798,751 | B1 | 9/2004 | Voit et al. |
| 7,051,078 | B1 | 5/2006 | Cheriton |
| 7,236,470 | B1 | 6/2007 | Bims |
| 7,245,623 | B1 | 7/2007 | Cheriton |
| 7,292,573 | B2 | 11/2007 | LaVigne et al. |

(Continued)

OTHER PUBLICATIONS

U.S. Appl. No. 12/853,883, filed Aug. 10, 2010.
U.S. Appl. No. 12/857,945, filed Aug. 17, 2010.
U.S. Appl. No. 12/856,247, filed Aug. 13, 2010.

*Primary Examiner* — Khanh Dinh
(74) *Attorney, Agent, or Firm* — Larson Newman, LLP

(57) ABSTRACT

A network device includes a port coupled to a device, another port coupled to another device, and an access control list with an access control entry that causes the network device to permit log in frames to be forwarded from the first device to the second device. The network device receives a frame addressed to the second device and determines the frame type. If the frame type is a log in frame, then the frame is forwarded to the second device and another access control entry is added to the access control list. The second access control entry causes the network device to permit data frames to be forwarded from the first device to the second device. If not, then the frame is dropped based upon the first access control entry.

17 Claims, 9 Drawing Sheets

(56) References Cited

U.S. PATENT DOCUMENTS

| | | | |
|---|---|---|---|
| 8,559,335 B2* | 10/2013 | Berman | H04L 45/02 370/254 |
| 9,178,969 B2* | 11/2015 | Berman | H04L 12/4625 |
| 2008/0288664 A1 | 11/2008 | Pettey et al. | |
| 2008/0310342 A1 | 12/2008 | Kruys et al. | |
| 2009/0161584 A1 | 6/2009 | Guan | |
| 2010/0027420 A1 | 2/2010 | Smith | |
| 2010/0061269 A1 | 3/2010 | Banerjee et al. | |
| 2010/0165995 A1 | 7/2010 | Mehta et al. | |
| 2011/0085560 A1 | 4/2011 | Chawla et al. | |
| 2012/0177042 A1* | 7/2012 | Berman | H04L 12/4625 370/392 |
| 2012/0177370 A1* | 7/2012 | Berman | H04L 49/357 398/58 |
| 2012/0303810 A1 | 11/2012 | Kotha et al. | |
| 2014/0092898 A1* | 4/2014 | Berman | H04L 12/4625 370/359 |
| 2014/0092909 A1* | 4/2014 | Berman | H04L 12/4625 370/392 |

\* cited by examiner

SYSTEM AND METHOD FOR OPTIMIZING SECURED INTERNET SMALL COMPUTER SYSTEM INTERFACE STORAGE AREA NETWORKS

CROSS REFERENCE TO RELATED APPLICATIONS

This application is a continuation of U.S. patent application Ser. No. 13/117,912 entitled "System and Method for Optimizing Secured Internet Small Computer System Interface Storage Area Networks," filed on May 27, 2011, the disclosure of which is hereby expressly incorporated by reference in its entirety.

FIELD OF THE DISCLOSURE

The present disclosure generally relates to information handling systems, and more particularly relates to optimizing Internet Small Computer System Interface storage area networks in an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, and networking systems. Information handlings systems can also implement various virtualized architectures.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings. Other teachings can be used in this application, and the teachings can be used in other applications and with different types of architectures, such as a client-server architecture, a distributed computing architecture, or a middleware server architecture and associated resources.

Figure 1:
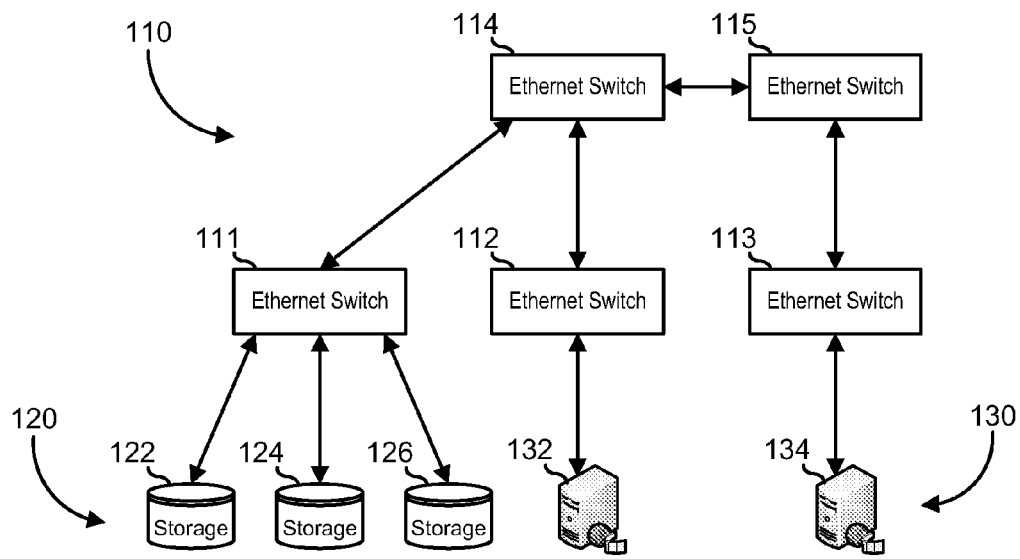
FIG. 1 is a block diagram of a storage area network according to an embodiment of the present disclosure.

FIG. 1 illustrates an embodiment of a storage area network (SAN) 100 that can include one or more information handling systems. For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

SAN 100 includes a network 110, a storage array 120, and client systems 130. Network 110 includes Ethernet switches 111 through 115 and forms a communication network between storage array 120 and client systems 130. Storage array 120 includes storage devices 122, 124, and 126, and provides network storage for client systems 130. Client systems 130 include servers 132 and 134. In a particular embodiment, SAN 100 is implemented as an Internet Small Computer System Interface (iSCSI) SAN, that provides an Internet Protocol (IP)-based storage network. As such, SAN 100 can use SCSI commands over network 100 to manage storage and facilitate data transfers between storage array 120 and client systems 130. Network 110 can be implemented as a local area network (LAN), a wide area network (WAN), an intranet, the Internet, another type of data network, or a combination thereof. Storage devices 122, 124, and 126 can operate as targets to receive SCSI commands, and can be implemented as one or more SCSI storage devices, as different volumes on a single SCSI storage device, as different volumes on a Redundant Array of Independent Drives (RAID) array of SCSI storage devices such as a RAID 5 array, a RAID 6 array, or another RAID configuration, as separate storage arrays, or as another configuration of SCSI storage devices, or a combination thereof. Servers 132 and 134 can operate as initiators to send SCSI commands to storage devices 122, 124, and 126, and can be implemented as separate information handling systems or as virtual machine instantiations on a single information handling system, as needed or desired.

Switches 111-113 provide connectivity to the iSCSI end points (such as storage devices 122, 124, and 126, and servers 132 and 134), and may be referred to as edge switches. Switches 114 and 115 provide the core connectivity to route data in SAN 100, and may be referred to as core switches. SAN 100 provides the storage resources of storage array 120 to client systems 130 based upon the storage needs of each server 132 and 134. For example, server 132 can be a Windows based server with a need for a Windows based storage capacity, and storage device 122 can be configured with a Windows based file system to provide that capacity. Also, server 134 can be a Linux based server with a need for a Linux based storage capacity, and storage device 124 can be configured with a Linux based file system to provide that capacity. Further, both servers 132 and 134 can have a need for a backup storage capacity, and storage device 126 can be configured with a common file system to provide a backup capacity for both servers. As such, server 132 can log into storage devices 122 and 126 through switches 112, 114, and 111, and server 134 can log into storage devices 124 and 126 through switches 113, 115, 114, and 111.

Figure 3:
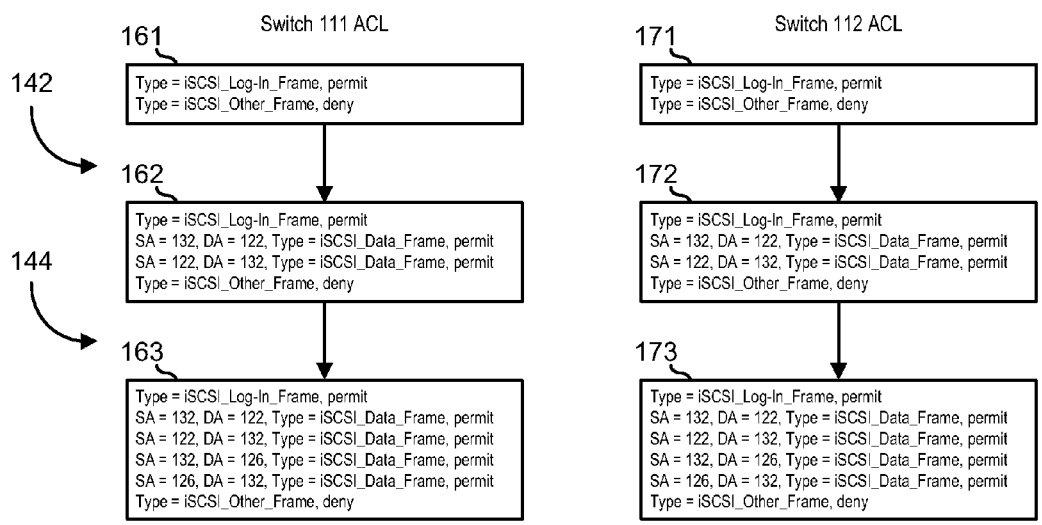
FIG. 3 illustrates changes to the access control lists of secured switches within the storage area network that result from the server logging in as illustrated in FIG. 2.

In a particular embodiment, edge switches 111-113 are secured switches and operate to snoop the data frames that are handled by the edge switches to determine the source address, the destination address, the frame type, and other information related to the data frames. Further, edge switches 111-113 operate to control the flow of the data frames that are handled by the edge switches. As such, edge switches 111-113 each implement an access control list (ACL) that defines a list of permissions that are associated with particular data frames. Thus, edge switches 111-113 provide security on SAN 100 by permitting approved frame traffic and dropping other frame traffic from the SAN. Further, edge switches 111-113 automatically respond to the changing conditions of SAN 100 by modifying their respective ACLs to permit or drop other frame traffic as needed or desired, and without the intervention of a system administrator or system manager to track and maintain the ACLs of each individual edge switch. In operation, edge switches 111 and 112 may start with the following default ACL:

Type=iSCSI_Log-In_Frame, permit
Type=iSCSI_Other_Frame, deny as illustrated in FIG. 3, ACL blocks 161 and 171, for respective switches 111 and 112. Here, any frame that is an iSCSI log-in frame is permitted to pass through the edge switches 111 and 112, and any other iSCSI frame of any other type is denied passage through the edge switches, and is dropped.

Figure 2:
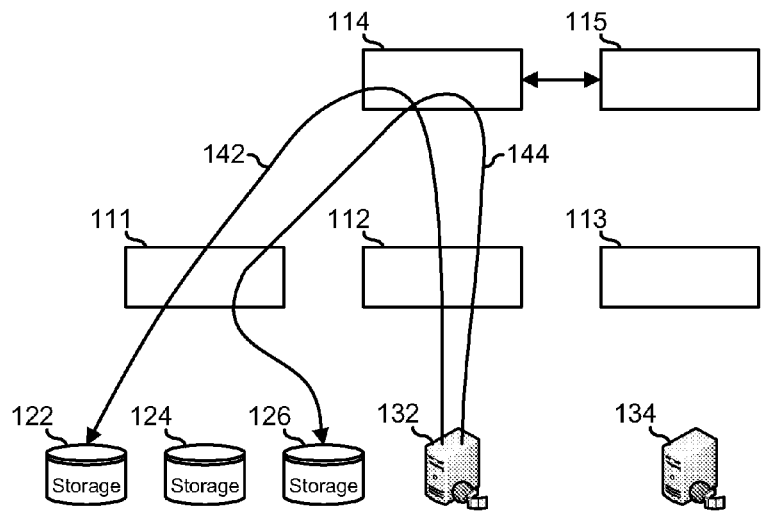
FIG. 2 illustrates a server of the storage area network of FIG. 1 logging into a storage array of the storage area network.

FIGS. 2 and 3 illustrate server 132 logging into storage devices 122 and 126, and the changes to the ACLs of switches 111 and 112 as a result of the server logging into the storage devices, respectively. When server 132 logs into storage device 122, an iSCSI log-in frame 142 is sent from the server, through switch 112, switch 114, and switch 111 to the storage device. When switches 111 and 112 detect the successful log-in of server 132 to storage device 122, the switches automatically modify the ACLs by adding the following access control entries (ACEs):

SA=132, DA=122, Type=iSCSI_Data_Frame, permit
SA=122, DA=132, Type=iSCSI_Data_Frame, permit as illustrated in ACL blocks 162 and 172. Here, the source address (SA) and the destination address (DA) indicate a unique device identifier on the network, and can include an IP address, a Media Access Control (MAC) address, an iSCSI Qualified Name (IQN), another unique device identifier, or a combination thereof. After successful log-in, any iSCSI data frame from server 132 that is destined for storage device 122 is permitted, and vice versa. When server 132 logs into storage device 126, an iSCSI log-in frame 144 is sent to the storage device. When switches 111 and 112 detect the successful log-in of server 132 to storage device 126, the switches automatically modify their ACLs by adding the following ACEs:

SA=132, DA=126, Type=iSCSI_Data_Frame, permit
SA=126, DA=132, Type=iSCSI_Data_Frame, permit as illustrated in ACL blocks 163 and 173. Here, after successful log-in, any iSCSI data frame from server 132 that is destined for storage device 126 is permitted, and vice versa.

Figure 4:
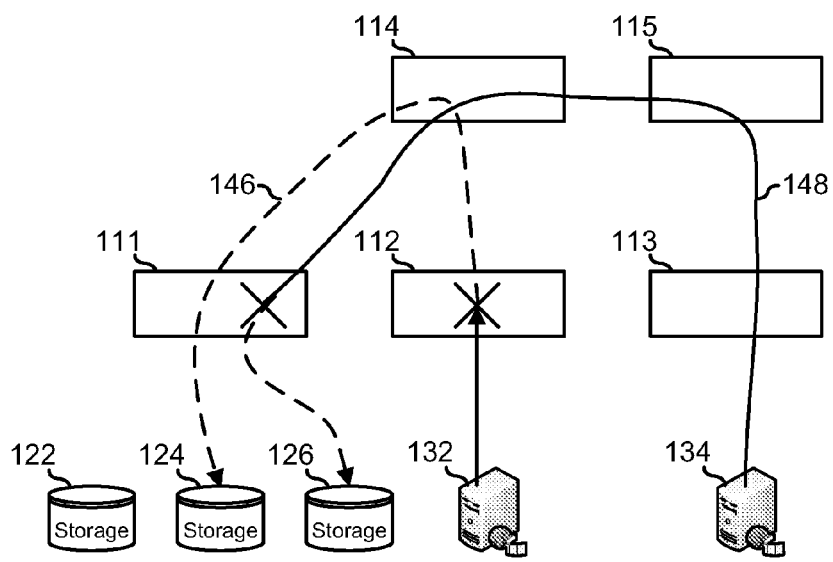
FIG. 4 illustrates disallowed transaction requests on the storage area network of FIG. 1 after the server has logged into the storage area network.

FIG. 4 illustrates disallowed transaction requests on SAN 100 after server 132 has logged in to the SAN. When server 132 sends a data frame 146 to storage device 124, switch 112 receives the frame, snoops the frame to determine the source address, the destination address, and the frame type, compares the information to its ACL, and determines whether to pass the frame or to drop it. Here, because data frame 146 is addressed to other than storage device 122 or storage device 126, the frame is dropped at switch 112. When server 134 sends a data frame 148 to storage device 126, switch 113 receives the frame and forwards it through switches 115 and 114 to switch 111. Switch 111 snoops the frame to determine the source address, the destination address, and the frame type, compares the information to its ACL, and determines whether to pass or to drop the frame. Here, because data frame 148 is neither a log-in frame, nor is it from server 132, the frame is dropped at switch 111. Thus, the administration of the ACLs can be accomplished at either the ingress point of network 110, or at the egress point of the network.

Figure 5:
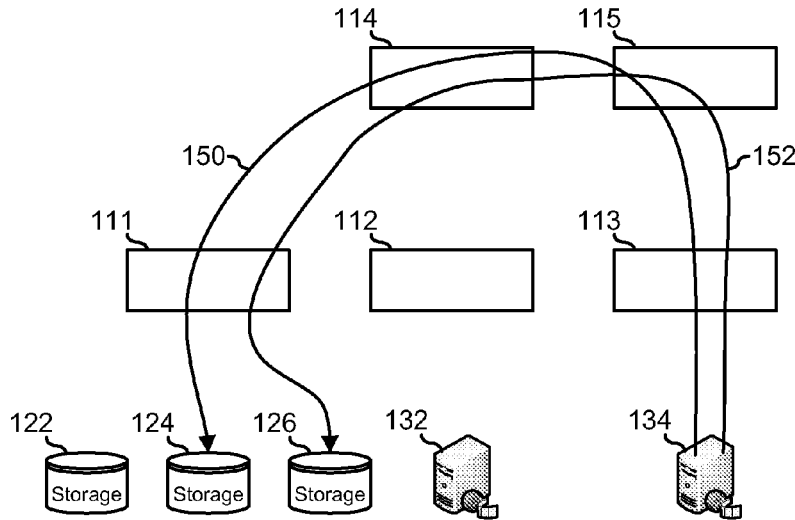
FIG. 5 illustrates another server of the storage area network of FIG. 1 logging into the storage array.
Figure 6:
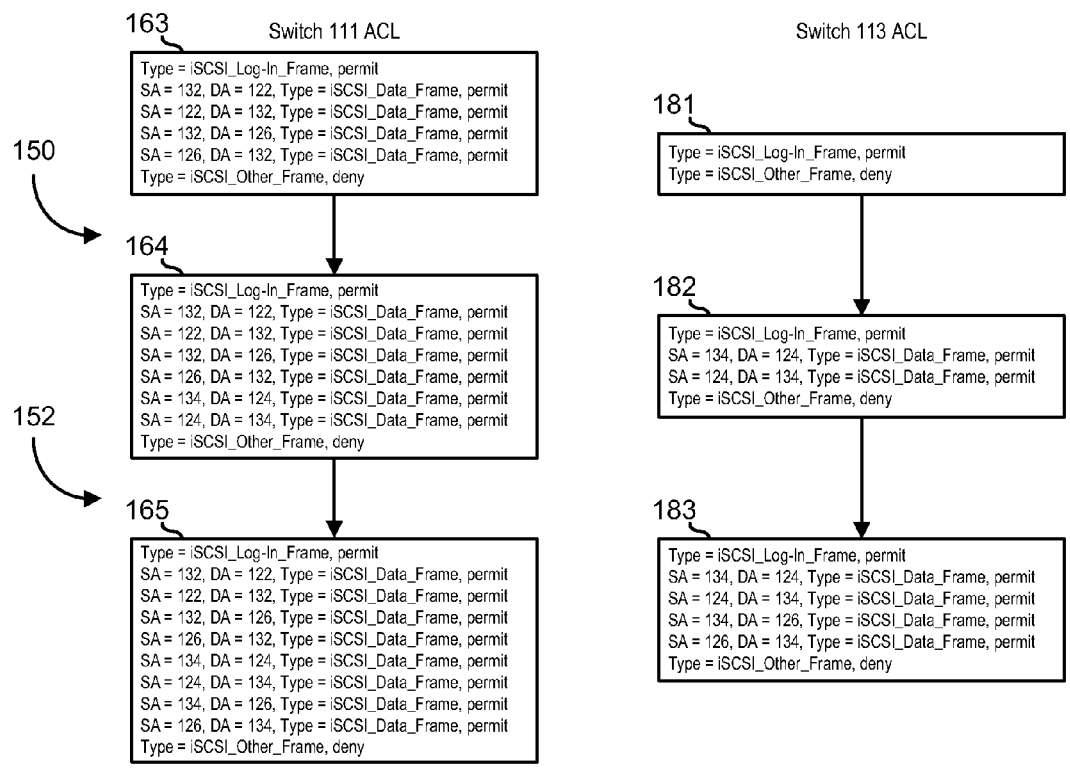
FIG. 6 illustrates changes to the access control lists of the secured switches that result from the server logging in as illustrated in FIG. 5.

FIGS. 5 and 6 illustrate server 134 logging into storage devices 124 and 126, and the changes to the ACLs of switches 111 and 113 as a result of the server logging into the storage devices, respectively. Here, switch 111 retains the ACL illustrated in block 163 and switch 113 is provided with the default ACL as illustrated in ACL block 181. When server 134 logs into storage device 124, an iSCSI log-in frame 150 is sent from the server, through switch 113, switch 115, switch 114, and switch 111 to the storage device. When switches 111 and 112 detect the successful log-in of server 134 to storage device 124, the switches automatically modify their ACLs by adding the following ACEs:

SA=134, DA=124, Type=iSCSI_Data_Frame, permit
SA=124, DA=134, Type=iSCSI_Data_Frame, permit as illustrated in ACL blocks 164 and 182. After successful log-in, any iSCSI data frame from server 134 that is destined for storage device 124 is permitted, and vice versa. When server 134 logs into storage device 126, an iSCSI log-in frame 152 is sent from the server to the storage device. When switches 111 and 113 detect the successful log-in of server 134 to storage device 126, the switches automatically modify their ACLs by adding the following ACE:

SA=134, DA=126, Type=iSCSI_Data_Frame, permit
SA=126, DA=134, Type=iSCSI_Data_Frame, permit as illustrated in ACL blocks 165 and 183. Here, after successful log-in, any iSCSI data frame from server 134 that is destined for storage device 126 is permitted, and vice versa.

Figure 7:
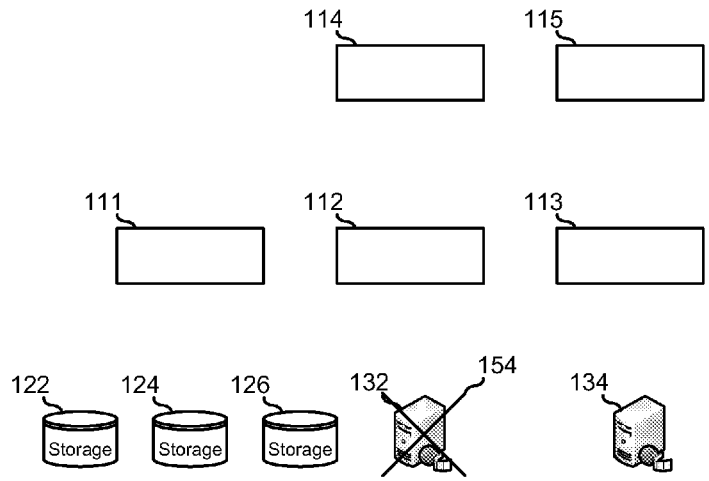
FIG. 7 illustrates a server of the storage area network of FIG. 1 logging out of the storage area array.
Figure 8:
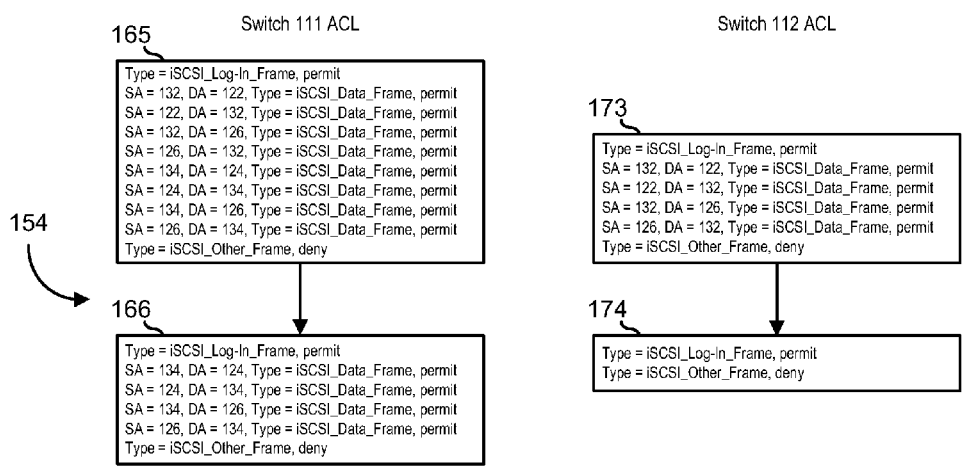
FIG. 8 illustrates changes to the access control lists of the secured switches that result from the server logging out as illustrated in FIG. 7.

FIGS. 7 and 8 illustrate server 132 of SAN 100 logging out of storage array 120, and changes to the ACLs of switches 111 and 112 that result from the server logging out of the storage array, respectively. When server 132 logs out of storage devices 122 and 126, switches 111 and 113 detect the event and automatically modify their ACLs by deleting the following ACEs:

SA=132, DA=122, Type=iSCSI_Data_Frame, permit
SA=122, DA=132, Type=iSCSI_Data_Frame, permit
SA=132, DA=126, Type=iSCSI_Data_Frame, permit
SA=126, DA=132, Type=iSCSI_Data_Frame, permit as illustrated in ACL blocks 166 and 174. Here, after server 132 is logged out, switches 111 and 112 will only permit frames from the server that are log-in frames, and data frames from the server will be denied. Logging server 132 out of storage devices 122 and 126 can be accomplished by the server sending log out frames to the storage devices, or by the server being disconnected from switch 112. As such, switches 111 and 112 can snoop the log out frames or detect that server 132 has become disconnected from switch 112 and delete the ACEs accordingly.

Figure 9:
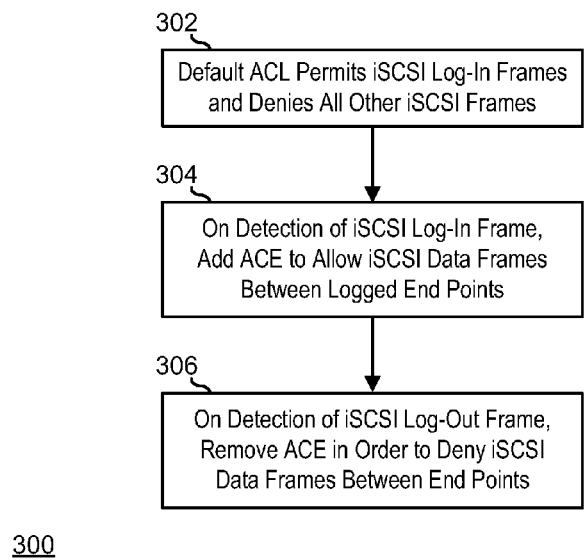
FIG. 9 is a flowchart illustrating a method of implementing a secured switch of the storage area network of FIG. 1 according to an embodiment of the present disclosure.

FIG. 9 is a flowchart illustrating a method of implementing a secured switch on a SAN according to an embodiment of the present disclosure. A secured switch is provided with a default ACL in block 302. The default ACL provides that iSCSI log-in frames are permitted, and that all other iSCSI frames are denied and are dropped in the switch. For example, switch 111 can be provided with ACL block 161. On detection of an iSCSI log-in frame and a successful log-in, the secured switch automatically adds an ACE to the ACL in block 304. The added ACE provides that iSCSI data frames are permitted between the initiator of the log-in and the target of the log-in. For example, switch 111 can add the ACE for permitting server 132 to send data frames to storage device 122, as illustrated in ACL block 162. On detection of an iSCSI log-out frame and a successful log-out, or on detection that an end point has become disconnected from a network, the secured switch automatically deletes one or more ACE from the ACL in block 306. For example, switch 111 can delete the ACEs for permitting server 132 to send data frames to storage devices 122 and 126, as illustrated in ACL block 166.

Figure 10:
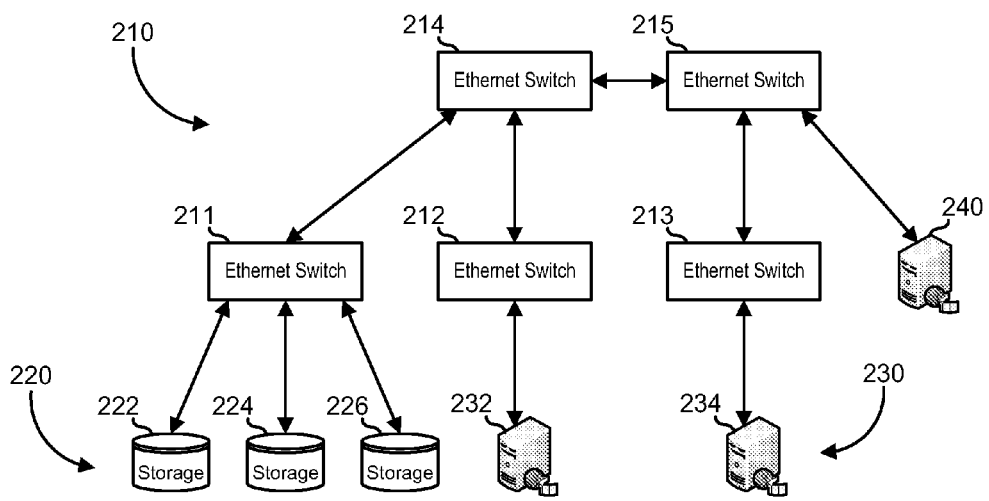
FIG. 10 is a block diagram of another storage area network according to an embodiment of the present disclosure.

FIG. 10 illustrates another embodiment of a SAN 200 that includes a network 210, a storage array 220, client systems 230, and an Internet Storage Name Service (iSNS) server 240. Network 210 includes Ethernet switches 211 through 215 and forms a communication network between storage array 220, client systems 230, and iSNS server 240. Storage array 220 includes storage devices 222, 224, and 226, and provides network storage for client systems 230. Client systems 230 include servers 232 and 234. In a particular embodiment, SAN 200 is implemented as an iSCSI SAN. Network 200 can be implemented as a LAN, a WAN, an intranet, the Internet, another type of data network, or a combination thereof. Storage devices 222, 224, and 226 can operate as targets to receive SCSI commands, and can be implemented as one or more SCSI storage devices, as different volumes on a single SCSI storage device, as different volumes on a RAID array of SCSI storage devices such as a RAID 5 array, a RAID 6 array, or another RAID configuration, as separate storage arrays, or as another configuration of SCSI storage devices, or a combination thereof. Servers 232 and 234 can operate as initiators to send SCSI commands to storage devices 222, 224, and 226, and can be implemented as separate information handling systems or as virtual machine instantiations on a single information handling system, as needed or desired. iSNS server 240 operates to provide for the registration and discovery of iSCSI endpoints (such as initiators, servers 232 and 234, and targets, storage devices 222, 224, and 226), and the management and configuration of SAN 200. In particular, the iSCSI endpoints register with iSNS server 240, and are assigned to one or more discovery domains by the iSNS server. iSNS server 240 communicates with the iSCSI endpoints through exchanged of frames that include iSNS protocol information.

Switches 211-213 may be edge switches and switches 214 and 215 may be core switches. SAN 200 provides the storage resources of storage array 220 to client systems 230 based upon the storage needs of each server 232 and 234. As in the above example, server 232 can be a Windows based server, server 234 can be a Linux based server, storage device 222 can be configured with a Windows based file system, storage device 124 can be configured with a Linux based file system, and storage device 226 can be configured with a common file system to provide a backup capacity for both servers. Here, the iSCSI endpoints register with iSNS server 240 and the iSNS server provides each endpoint with the associated discovery domains that they can be logged into. After receiving the discovery domain information, server 232 can log into storage devices 222 and 226, and server 234 can log into storage devices 224 and 226.

Figure 12:
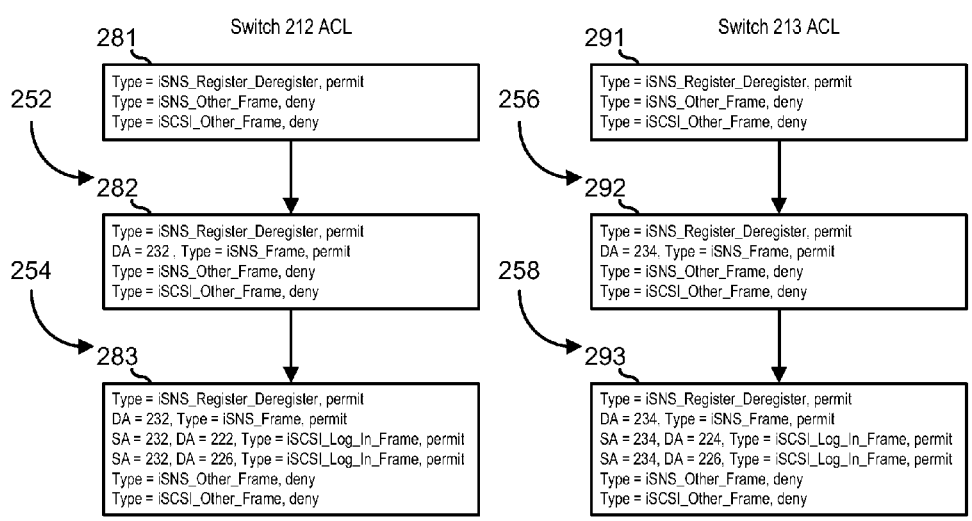
FIG. 12 illustrates changes to the access control lists of secured switches within the storage area network that result from the registration and receipt of the domain discovery information as illustrated in FIG. 11.

In a particular embodiment, edge switches 211-213 are secured iSNS switches and operate to snoop the data frames that are handled by the edge switches to determine the source address, the destination address, the frame type, and other information related to the data frames. Further, edge switches 211-213 operate to control the flow of the data frames that are handled by the edge switches. As such, edge switches 211-213 each implement an ACL. Thus, edge switches 111-113 provide security on SAN 200 by permitting approved frame traffic and dropping other frame traffic from the SAN. Further, edge switches 211-213 automatically respond to the changing conditions of SAN 100 by modifying their respective ACLs to permit or drop other frame traffic as needed or desired, and without the intervention of a system administrator, system manager, or iSNS server 240 to track and maintain the ACLs of each individual edge switch. In operation, edge switches 211 and 212 may start with the following default ACL:

Type=iSNS_Register_Deregister, permit
Type=iSNS_Other_Frame, deny
Type=iSCSI_Other_Frame, deny as illustrated in FIG. 12, ACL blocks 281 and 291, for respective switches 212 and 213. Here, any frame that is an iSNS register or deregister frame is permitted to pass through the edge switches 212 and 213, and any iSNS frame or iSCSI frame of any other type is denied passage through the edge switches, and is dropped. In another embodiment, edge switches 212 and 213 may start with default ACLs that only permit iSNS register or deregister frames that are sent to iSNS server 240. In this way, a false iSNS server is prevented from spoofing the identity of iSNS server 240.

Figure 11:
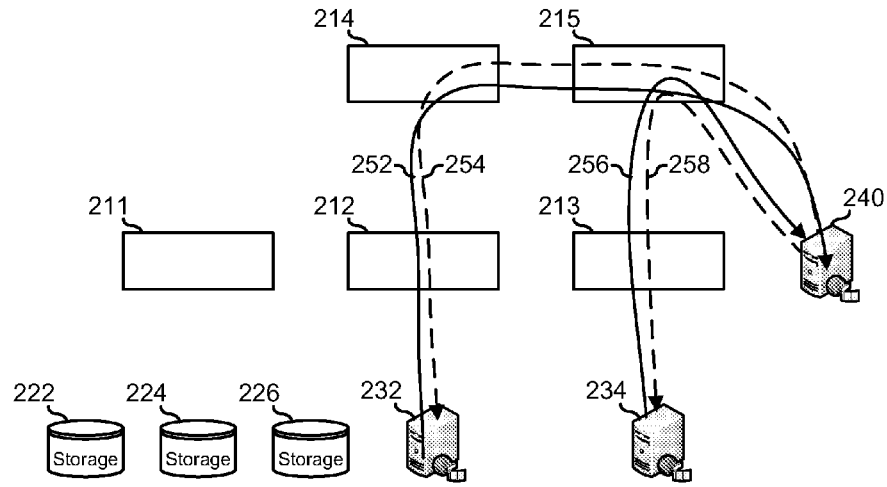
FIG. 11 illustrates servers of the storage area network of FIG. 10 registering with an Internet Storage Name Service (iSNS) server of the storage area network and receiving domain discovery information from the iSNS server.

FIG. 11 illustrates servers 232 and 234 registering with iSNS server 240, and the iSNS server providing the discovery domains for each server back to the respective servers, and FIG. 12 illustrates the changes to the ACLs of switches 212 and 213 as a result of the registrations and the provision of the discovery domains. When servers 232 and 234 register with iSNS server 240, iSNS registration frames 252 and 254, respectively, are sent from the servers to the iSNS server. When switches 212 and 213 detect the successful registration of servers 232 and 234 onto iSNS server 240, the switches automatically modify their ACLs by adding the following ACEs:

DA=232, Type=iSNS_Frame, permit (for switch 212)
DA=234, Type=iSNS_Frame, permit (for switch 213)

as illustrated in ACL blocks 282 and 292, respectively. After successful registration, any iSNS frames from iSNS server 240 to servers 232 and 234 are permitted. After the successful registration, iSNS server 240 sends a discovery domain frame 256 to server 232, and a discovery domain frame 258 to server 234. When switches 212 and 213 detect the discovery domain frames, the switches automatically modify their ACLs to permit log-in activity by servers 232 and 234 according to the discovery domain information included in discovery domain frames 256 and 258. As such, switch 212 adds the following ACEs:

SA=232, DA=222, Type=iSCSI_Log_In_Frame, permit
SA=232, DA=226, Type+iSCSI_Log_In_Frame, permit as illustrated in ACL blocks 283, and switch 213 adds the following ACEs:

SA=234, DA=224, Type=iSCSI_Log_In_Frame, permit
SA=234, DA=226, Type+iSCSI_Log_In_Frame, permit as illustrated in ACL blocks 283.

Figure 14:
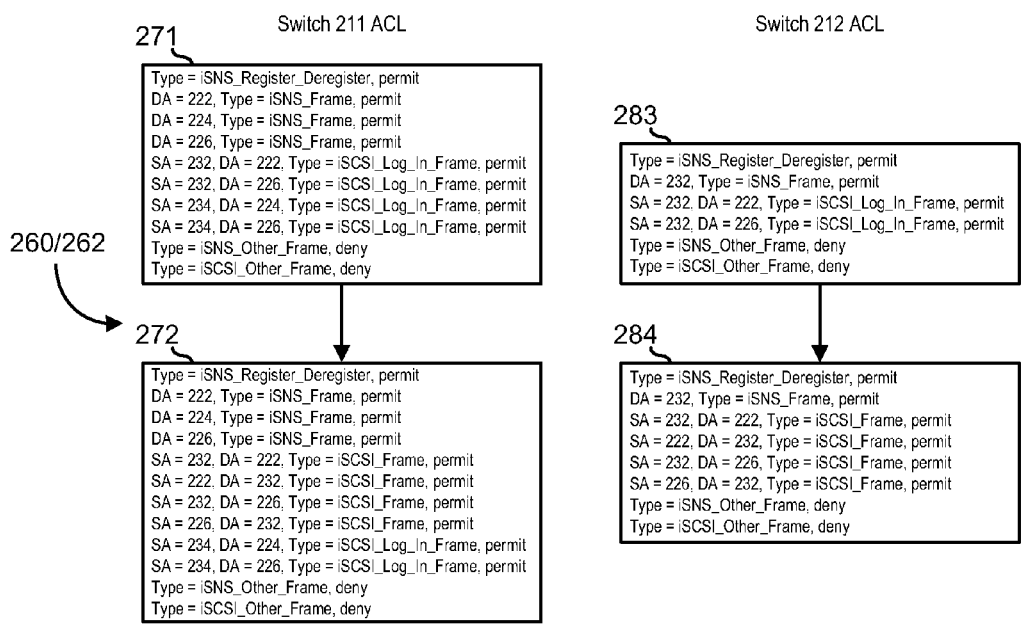
FIG. 14 illustrates changes to the access control lists of the secured switches that result from the server logging in as illustrated in FIG. 13.

As iSNS endpoints, storage devices 222, 224, and 226 also register with iSNS server 240, and receive discovery domain frames from the iSNS server. Here, when switch 211 detects the registrations and the discovery domain frames for storage devices 222, 224, and 226, the switch automatically modifies its ACL to include the following ACEs:

DA=222, Type=iSNS_Frame, permit
DA=224, Type=iSNS_Frame, permit
DA=226, Type=iSNS_Frame, permit
SA=232, DA=222, Type=iSCSI_Log_In_Frame, permit
SA=232, DA=226, Type=iSCSI_Log_In_Frame, permit
SA=234, DA=224, Type=iSCSI_Log_In_Frame, permit
SA=234, DA=226, Type=iSCSI_Log_In_Frame, permit as illustrated in ACL blocks 271 of FIG. 14.

Figure 13:
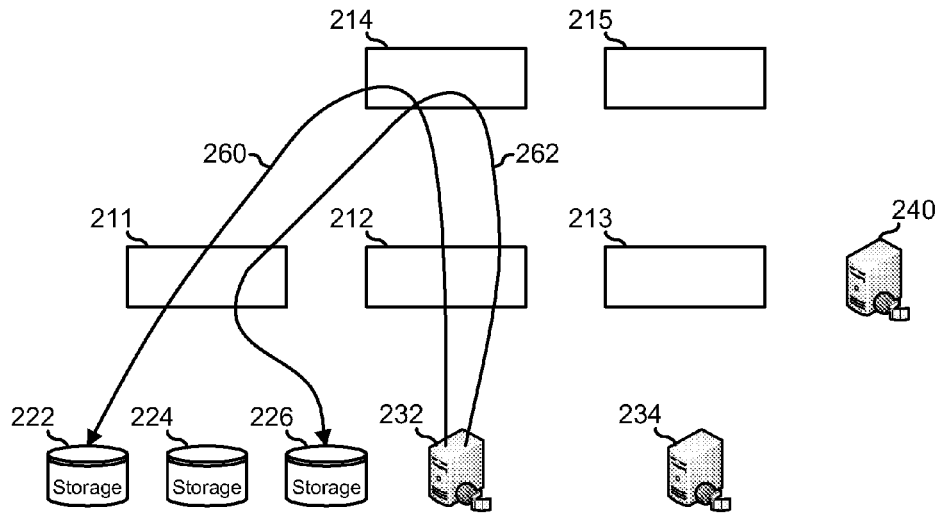
FIG. 13 illustrates a server of the storage area network of FIG. 10 logging into a storage array of the storage area network.

FIGS. 13 and 14 illustrate server 232 logging into storage devices 222 and 226, and the changes to the ACLs of switches 211 and 212 as a result of the server logging into the storage devices, respectively. When server 232 logs into storage devices 222 and 226, iSCSI log-in frames 260 and 262, respectively, are sent from the server to the storage devices. When switches 211 and 212 detect the successful log-in of server 232 to storage devices 222 and 226, the switches automatically modify their ACLs by changing the following access control entries (ACEs):

SA=232, DA=222, Type=iSCSI_Log_In_Frame, permit
to
SA=232, DA=222, Type=iSCSI_Frame, permit
SA=222, DA=232, Type=iSCSI_Frame, permit
and
SA=232, DA=226, Type=iSCSI_Log_In_Frame, permit
to
SA=232, DA=226, Type=iSCSI_Frame, permit
SA=226, DA=232, Type=iSCSI_Frame, permit as illustrated in ACL blocks 272 and 284. After successful log-in, any iSCSI data frames from server 232 that are destined for storage devices 222 and 226 are permitted, and vice versa.

Figure 15:
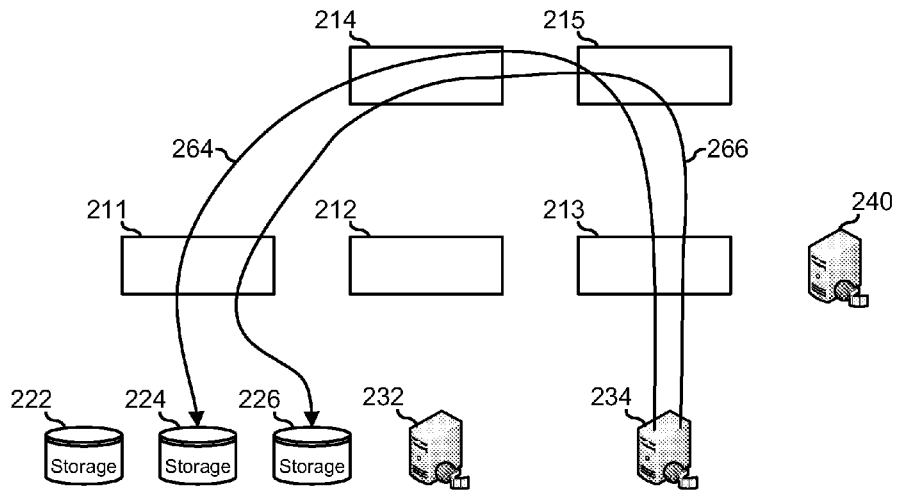
FIG. 15 illustrates another server of the storage area network of FIG. 10 logging into the storage array.
Figure 16:
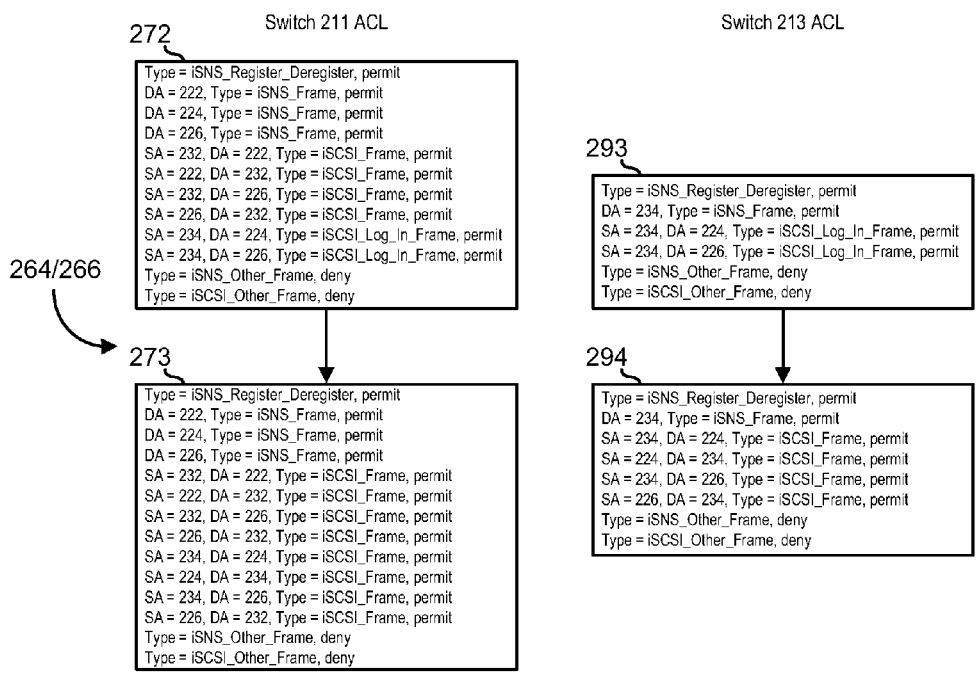
FIG. 16 illustrates changes to the access control lists of the secured switches that result from the server logging in as illustrated in FIG. 15.

FIGS. 15 and 16 illustrate server 234 logging into storage devices 224 and 226, and the changes to the ACLs of switches 211 and 213 as a result of the server logging into the storage devices, respectively. When server 234 logs into storage devices 224 and 226, iSCSI log-in frames 264 and 266, respectively, are sent from the server to the storage devices. When switches 211 and 213 detect the successful log-in of server 234 to storage devices 224 and 226, the switches automatically modify their ACLs by adding the following access control entries (ACEs):

SA=234, DA=224, Type=iSCSI_Log_In_Frame, permit
to
SA=234, DA=224, Type=iSCSI_Frame, permit
SA=224, DA=234, Type=iSCSI_Frame, permit
and
SA=234, DA=226, Type=iSCSI_Log_In_Frame, permit
to
SA=234, DA=226, Type=iSCSI_Frame, permit
SA=226, DA=234, Type=iSCSI_Frame, permit as illustrated in ACL blocks 273 and 294. After successful log-in, any iSCSI data frames from server 234 that are destined for storage devices 224 and 226 are permitted, and vice versa.

Figure 17:
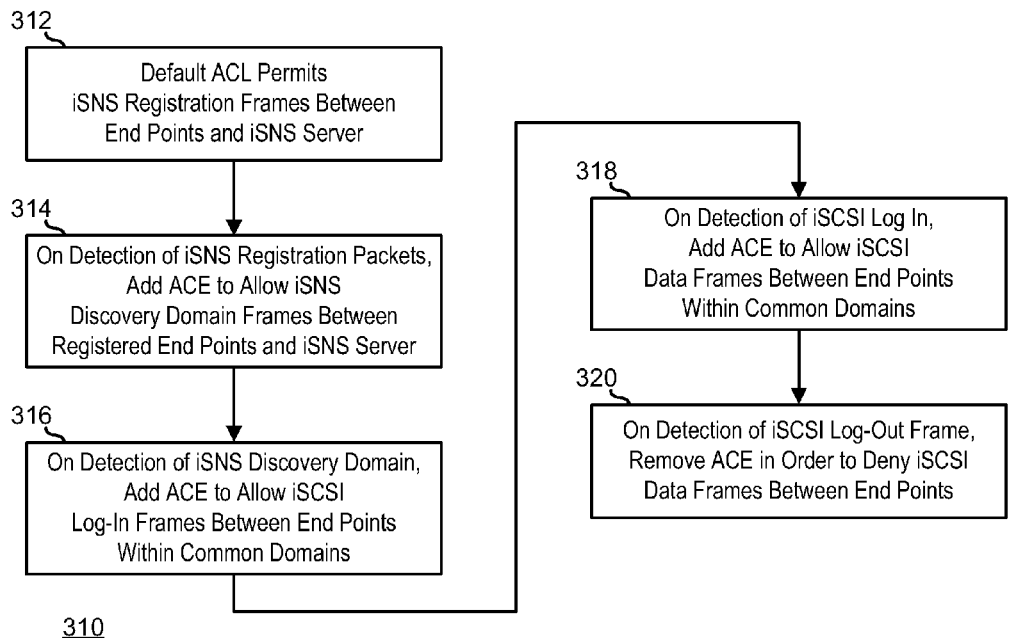
FIG. 17 is a flowchart illustrating a method of implementing a secured switch of the storage area network of FIG. 10 according to an embodiment of the present disclosure.

FIG. 17 is a flowchart illustrating a method of implementing a secured iSNS switch on a SAN according to an embodiment of the present disclosure. A secured iSNS switch is provided with a default ACL in block 312. The default ACL provides that iSNS registration frames are permitted, and all other iSNS or iSCSI frame are denied in the switch. For example, switch 213 can be provided with ACL block 291. On detection of successful registration to the iSNS server, the secured iSNS switch automatically adds an ACE to the ACL in block 314. The added ACE provides that iSNS discovery domain frames are permitted between the initiator of the registration and the iSNS server. For example, switch 213 can add the ACE for permitting server 234 to receive iSNS discovery frames, as illustrated in ACL block 292. On detection of the receipt of a discovery domain frame from the iSNS server, the secured iSNS switch automatically adds an ACE to the ACL in block 316. The added ACE provides that iSCSI log-in frames are permitted between endpoints in a common domain, and all other iSCSI frames are denied in the switch. For example, switch 213 can add the ACEs to permit server 234 to log into storage devices 224 and 226, as illustrated in ACL block 293. On detection of an iSCSI log-in frame and a successful log-in, the secured iSNS switch automatically adds an ACE to the ACL in block 318. The added ACE provides that iSCSI data frames are permitted between the initiator of the log-in and the target of the log-in. For example, switch 313 can add the ACEs for permitting server 234 to send data frames to storage devices 224 and 226, as illustrated in ACL block 294. On detection of an iSCSI log-out frame and a successful log-out, or on detection that an end point has become disconnected from a network, the secured iSNS switch automatically deletes one or more ACE from the ACL in block 320.

As used herein, the term "switch" includes other types of networking equipment, including, but not limited to a router, a hub, a bridge, a gateway, a repeater, another type of networking equipment, or a combination thereof. Also, in the above illustrations, ACEs were shown that included clients 132, 134, 232, and 234 as the source device, and storage devices 122, 224, 126, 222, 224, and 226 as the destination device. It will be recognized that ACEs can be added that include the storage devices as the source device and the clients as the destination device, so that frames can be communicated in both directions. Further, it will be recognized that other types of network devices can be substituted for the servers and the storage devices as initiators and targets in the above embodiments. Further, as used herein, the term "frame" includes other types of data unit on a network including a packet, a datagram, another type of data unit, or a combination thereof, and the functions, features, and methods described above are generally operable with the other types of data units, and at various network levels.

In a particular embodiment, a secure iSNS switch, such as switches 211, 212, and 213, operates to determine if an end point is an iSNS end point. If so, then the ACL for the secure iSNS switch can initially include ACEs that permit the end point to only send registration frames to an iSNS server. If the endpoint is not operable as an iSNS endpoint, then the ACL can initially include ACEs that permit the end point to only send log in frames to other end points. In another embodiment, a secure iSNS switch operates to determine if an end point is an initiator. If so, then the ACL for the secure iSNS switch can initially include ACEs that only permit iSNS registrations frames or iSCSI log in frames from the end points. Similarly, if the secure iSNS switch determines that an endpoint is a target, the ACL can initially include ACEs that only permit iSCSI log in frames to the end point.

Figure 18:
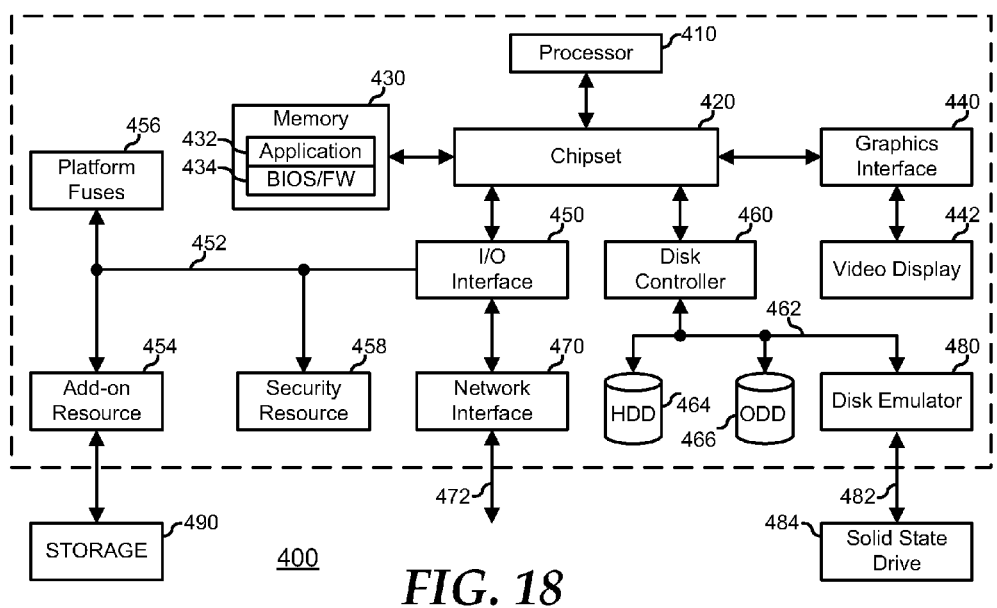
FIG. 18 is a block diagram illustrating an information handling system according to another embodiment of the present disclosure.

FIG. 18 is a block diagram illustrating an embodiment of an information handling system 400, including a processor 410, a chipset 420, a memory 430, a graphics interface 440, an input/output (I/O) interface 450, a disk controller 460, a network interface 470, and a disk emulator 480. In a particular embodiment, information handling system 400 is used to carry out one or more of the methods described herein. In another embodiment, one or more of the systems described herein are implemented in the form of information handling system 400.

Chipset 420 is connected to and supports processor 410, allowing the processor to execute machine-executable code. In a particular embodiment (not illustrated), information handling system 400 includes one or more additional processors, and chipset 420 supports the multiple processors, allowing for simultaneous processing by each of the processors and permitting the exchange of information among the processors and the other elements of the information handling system. Chipset 420 can be connected to processor 410 via a unique channel, or via a bus that shares information among the processor, the chipset, and other elements of information handling system 400.

Memory 430 is connected to chipset 420. Memory 430 and chipset 420 can be connected via a unique channel, or via a bus that shares information among the chipset, the memory, and other elements of information handling system 400. In another embodiment (not illustrated), processor 410 is connected to memory 430 via a unique channel. In another embodiment (not illustrated), information handling system 400 includes separate memory dedicated to each of the one or more additional processors. A non-limiting example of memory 430 includes static random access memory (SRAM), dynamic random access memory (DRAM), non-volatile random access memory (NVRAM), read only memory (ROM), flash memory, another type of memory, or any combination thereof.

Graphics interface 440 is connected to chipset 420. Graphics interface 440 and chipset 420 can be connected via a unique channel, or via a bus that shares information among the chipset, the graphics interface, and other elements of information handling system 400. Graphics interface 440 is connected to a video display 442. Other graphics interfaces (not illustrated) can also be used in addition to graphics interface 440 as needed or desired. Video display 442 includes one or more types of video displays, such as a flat panel display, another type of display device, or any combination thereof.

I/O interface 450 is connected to chipset 420. I/O interface 450 and chipset 420 can be connected via a unique channel, or via a bus that shares information among the chipset, the I/O interface, and other elements of information handling system 400. Other I/O interfaces (not illustrated) can also be used in addition to I/O interface 450 as needed or desired. I/O interface 450 is connected via an I/O interface 452 to one or more add-on resources 454. Add-on resource 454 is connected to a storage system 490, and can also include another data storage system, a graphics interface, a network interface card (NIC), a sound/video processing card, another suitable add-on resource or any combination thereof. I/O interface 450 is also connected via I/O interface 452 to one or more platform fuses 456 and to a security resource 458. Platform fuses 456 function to set or modify the functionality of information handling system 400 in hardware. Security resource 458 provides a secure cryptographic functionality and includes secure storage of cryptographic keys. A non-limiting example of security resource 458 includes a Unified Security Hub (USH), a Trusted Platform Module (TPM), a General Purpose Encryption (GPE) engine, another security resource, or a combination thereof.

Disk controller 460 is connected to chipset 420. Disk controller 460 and chipset 420 can be connected via a unique channel, or via a bus that shares information among the chipset, the disk controller, and other elements of information handling system 400. Other disk controllers (not illustrated) can also be used in addition to disk controller 460 as needed or desired. Disk controller 460 includes a disk interface 462. Disk controller 460 is connected to one or more disk drives via disk interface 462. Such disk drives include a hard disk drive (HDD) 464, and an optical disk drive (ODD) 466, and can include one or more disk drive as needed or desired. ODD 466 can include a Read/Write Compact Disk (R/W-CD), a Read/Write Digital Video Disk (R/W-DVD), a Read/Write mini Digital Video Disk (R/W mini-DVD, another type of optical disk drive, or any combination thereof. Additionally, disk controller 460 is connected to disk emulator 480. Disk emulator 480 permits a solid-state drive 484 to be coupled to information handling system 400 via an external interface 482. External interface 482 can include industry standard busses such as USB or IEEE 1394 (Firewire) or proprietary busses, or any combination thereof. Alternatively, solid-state drive 484 can be disposed within information handling system 400.

Network interface device 470 is connected to I/O interface 450. Network interface 470 and I/O interface 450 can be coupled via a unique channel, or via a bus that shares information among the I/O interface, the network interface, and other elements of information handling system 400. Other network interfaces (not illustrated) can also be used in addition to network interface 470 as needed or desired. Network interface 470 can be a network interface card (NIC) disposed within information handling system 400, on a main circuit board such as a baseboard, a motherboard, or any combination thereof, integrated onto another component such as chipset 420, in another suitable location, or any combination thereof. Network interface 470 includes a network channel 472 that provide interfaces between information handling system 400 and other devices (not illustrated) that are external to information handling system 400. Network interface 470 can also include additional network channels (not illustrated).

Information handling system 400 includes one or more application programs 432, and Basic Input/Output System and Firmware (BIOS/FW) code 434. BIOS/FW code 434 functions to initialize information handling system 400 on power up, to launch an operating system, and to manage input and output interactions between the operating system and the other elements of information handling system 400. In a particular embodiment, application programs 432 and BIOS/FW code 434 reside in memory 430, and include machine-executable code that is executed by processor 410 to perform various functions of information handling system 400. In another embodiment (not illustrated), application programs and BIOS/FW code reside in another storage medium of information handling system 400. For example, application programs and BIOS/FW code can reside in HDD 464, in a ROM (not illustrated) associated with information handling system 400, in an option-ROM (not illustrated) associated with various devices of information handling system 400, in storage system 490, in a storage system (not illustrated) associated with network channel 472, in another storage medium of information handling system 400, or a combination thereof. Application programs 432 and BIOS/FW code 434 can each be implemented as single programs, or as separate programs carrying out the various features as described herein.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality. The information handling system can include memory (volatile (e.g. random-access memory, etc.), non-volatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A network device comprising:
a memory including an access control list; and
a processor operable to receive a data frame from a first end point device coupled to the network device, the data frame being addressed to a second end point device coupled to the network device;
determine if the data frame is a log-in frame;
in response to determining that the data frame is the log-in frame, to:
forward the data frame to the second end point device; and
add a first access control entry to the access control list to permit subsequent data frames to be forwarded from the first end point device to the second end point device;
in response to determining that the data frame is not the log-in frame to drop the data frame;
determine that the first end point device is uncoupled from the network device; and
in response to determining that the first end point device is uncoupled, remove the first access control entry from the access control list.

2. The network device of claim 1, wherein in further response to determining that the data frame is the log in frame, the processor is operable to:
add a second access control entry to the access control list to permit subsequent data frames to be forwarded from the second end point device to the first end point device.

3. The network device of claim 1, wherein in determining that the first end point device is uncoupled from the network device, the processor is further operable to:
receive a log off frame from the first end point device, the log off frame being addressed to the second end point device.

4. The network device of claim 1, wherein in determining that the first end point device is uncoupled from the network device, the processor is further operable to:
determine that the first end point device is uncoupled from a port of the network device.

5. The network device of claim 1, wherein the network device is an Internet Small Computer System Interface network device.

6. An Internet storage name system (iSNS) network device comprising:
a memory including an access control list; and
a processor operable to:
receive a first data frame from a first end point device coupled to the iSNS network device, the first data frame being addressed to an iSNS server coupled to the iSNS network device;
determine if the first data frame is an iSNS registration frame;
in response to determining that the first data frame is the iSNS registration frame, to:
forward the first data frame to the iSNS server; and
add a first access control entry to the access control list to permit iSNS discovery frames to be forwarded from the iSNS server to the first end point device;
in response to determining that the first data frame is not the iSNS registration frame, to drop the data frame;
determine that the first end point device is uncoupled from iSNS network device; and
in response to determining that the first end point device is uncoupled, remove the third access control entry from the access control list.

7. The iSNS network device of claim 6, wherein the processor is further operable to:

receive an a second data frame from the iSNS server, the second data frame being addressed to the first end point device; and
determine if the second data frame is an iSNS discovery frame;
in response to determining that the second data frame is the iSNS discovery frame, to:
forward the second data frame to the first end point device; and
add a second access control entry to the access control list to permit log in frames to be forwarded from the first end point device to a second end point device coupled to the iSNS network device, wherein the identity of the second end point device is determined based upon the iSNS discovery frame; and
in response to determining that the second data frame is not the iSNS discovery frame, to drop the second data frame.

8. The iSNS network device of claim 7, wherein the processor is operable to:
receive a third frame from the first end point device, the third frame being addressed to the second end point device;
determine if the third data frame is a log in frame;
in response to determining that the third frame is the log in frame, to:
forward the third data frame to the second end point device; and
add a third access control entry to the access control list to permit data frames to be forwarded from the first end point device to the second end point device; and
in response to determining that the third data frame is not the log in frame, to drop the third frame.

9. The iSNS network device of claim 8, wherein in further response to that the third data frame is the log in frame, the processor is operable to:
add a fourth access control entry to the access control to permit data frames to be forwarded from the second end point device to the first end point device.

10. The iSNS network device of claim 6, wherein in determining that the first end point device is uncoupled from the iSNS network device, the processor is further operable to:
receive a log off frame from the first end point device, wherein the log off frame is addressed to the second end point device.

11. The iSNS network device of claim 6, wherein in determining that the first end point device is uncoupled from the iSNS network device, the processor is further operable to:
determine that the first end point device is uncoupled from a port of the iSNS network device.

12. A method comprising:
receiving, at a network device, a first data frame from a first end point device coupled to the network device, the first data frame being addressed to an iSNS server;
determining if the first data frame is an Internet storage name system (iSNS) registration frame;
in response to determining that the first data frame is the iSNS registration frame:
forwarding the first data frame to the iSNS server; and
adding a first access control entry to the access control list to permit iSNS discovery frames to be forwarded from the iSNS server to the first end point device;
in response to determining that the first data frame is not the iSNS registration frame, to drop the first data frame;

determining that the first end point device is uncoupled from the network device; and
in response to determining that the first end point device is uncoupled, removing the third access control entry from the access control list.

13. The method of claim 12, further comprising:
receiving a second data frame from the iSNS server, the second data frame being addressed to the first end point device;
determining if the second data frame is an iSNS discovery frame;
in response to determining that the second data frame is the iSNS discovery frame:
forwarding the second data frame to the first end point device; and
adding a second access control entry to the access control list to permit log in frames to be forwarded from the first end point device to a second end point device coupled to the network device, wherein the identity of the second end point device is determined based upon the iSNS discovery frame; and
in response to determining that the second data frame is not the iSNS discovery frame, to drop the second data frame.

14. The method of claim 13, further comprising:
receiving a third data frame from the first end point device, the third data frame being addressed to the second end point device;
determining if the third data frame is a log in frame;
in response to determining that the third data frame is the log in frame:
forwarding the third data frame to the second end point device; and
adding a third access control entry to the access control list to permit data frames to be forwarded from the first end point device to the second end point device; and
in response to determining that the third data frame is not the log in frame to drop the third frame.

15. The method of claim 14, wherein in further response to determining that the third frame is the log in frame, the method comprises:
adding a fourth access control entry to the access control to permit data frames to be forwarded from the second end point device to the first end point device.

16. The method of claim 12, wherein in determining that the first end point device is uncoupled from the network device, the method further comprises:
receiving a log off frame from the first end point device, the log off frame being addressed to the second end point device.

17. The method of claim 12, wherein in determining that the first end point device is uncoupled from the network device, the method further comprises:
determining that the first end point device is uncoupled from a port of the network device.

* * * * *